US012539439B2

(12) United States Patent
Scott

(10) Patent No.: US 12,539,439 B2
(45) Date of Patent: Feb. 3, 2026

(54) BARBELL COLLAR

(71) Applicant: Titan Manufacturing and Distributing, Inc., Memphis, TN (US)

(72) Inventor: Austin T. Scott, Westerville, OH (US)

(73) Assignee: TITAN MANUFACTURING AND DISTRIBUTING, INC., Memphis, TN (US)

( * ) Notice: Subject to any disclaimer, the term of this patent is extended or adjusted under 35 U.S.C. 154(b) by 118 days.

(21) Appl. No.: 18/614,366

(22) Filed: Mar. 22, 2024

(65) Prior Publication Data

US 2024/0316389 A1   Sep. 26, 2024

Related U.S. Application Data

(60) Provisional application No. 63/454,526, filed on Mar. 24, 2023.

(51) Int. Cl.
*A63B 21/072* (2006.01)

(52) U.S. Cl.
CPC ...... *A63B 21/0728* (2013.01); *A63B 21/0724* (2013.01)

(58) Field of Classification Search
CPC .......................... A63B 21/0724; A63B 21/0728
See application file for complete search history.

(56) References Cited

U.S. PATENT DOCUMENTS

| | | | |
|---|---|---|---|
| 4,585,367 A | 4/1986 | Gall | |
| 4,893,810 A | 1/1990 | Lee | |
| 5,062,631 A * | 11/1991 | Dau | A63B 21/0728 403/330 |
| 5,163,887 A | 11/1992 | Hatch | |
| 6,007,268 A | 12/1999 | Whittington et al. | |
| 9,095,743 B2 | 8/2015 | Davies, III | |
| 9,381,392 B2 | 7/2016 | Behle | |
| 10,195,476 B2 | 2/2019 | Jennings | |
| 11,117,013 B1 | 9/2021 | Davies et al. | |
| 11,835,073 B2 * | 12/2023 | Stilson | F16B 2/08 |
| 11,896,866 B2 * | 2/2024 | Clifford | F16B 2/16 |
| 11,998,791 B2 * | 6/2024 | Zhang | A63B 21/0724 |
| 2008/0287271 A1 * | 11/2008 | Jones | F16B 2/10 482/107 |
| 2017/0151460 A1 * | 6/2017 | Jennings | A63B 21/0728 |
| 2019/0383431 A1 * | 12/2019 | Magagna | F16B 2/185 |
| 2021/0001165 A1 | 1/2021 | Stilson | |
| 2022/0314060 A1 | 10/2022 | Fogle et al. | |
| 2022/0362619 A1 | 11/2022 | Clifford | |
| 2023/0226399 A1 * | 7/2023 | Yousfi | A63B 21/0728 482/107 |

FOREIGN PATENT DOCUMENTS

| | | |
|---|---|---|
| EP | 0730098 A1 | 9/1996 |
| FR | 2618862 A1 | 2/1989 |
| WO | 2005082221 A1 | 9/2005 |

* cited by examiner

*Primary Examiner* — Joshua Lee
(74) *Attorney, Agent, or Firm* — Epstein Becker & Green, P.C.

(57) ABSTRACT

A barbell collar for securing weight plates to a barbell is disclosed. The barbell collar operates by rotating the housing assembly to lock or unlock the collar. The mechanism of operation involves a compression ring with a diameter that decreases around the barbell resulting in a tighter grip around the barbell.

13 Claims, 15 Drawing Sheets

BARBELL COLLAR

FIELD OF THE INVENTION

The present invention relates to the sport of weightlifting. More particularly, the present invention relates to barbell collars for securing weight plates to a barbell while in use.

BACKGROUND OF THE INVENTION

Barbells are well-known in the sports of weight training, bodybuilding, weightlifting, powerlifting, Olympic lifting, and strongman competitions. Generally, the barbell comprises a shaft, sleeves for supporting weight plates while loaded, bearings that allow the sleeves to spin independently from the shaft, and interior collars that stop the weight plates from sliding onto the shaft (See FIG. 5-FIG. 8). Standard barbells are uniform in size, but there is significant variation in shapes and sizes. For example, EZ Barbells have bent shafts and barbells may be short enough that they can serve as dumb bells.

A weight plate is a flat, heavy object, usually made of cast iron, polyurethane, or rubber, which is used in combination with barbells or dumbbells to produce a bar with a desired total weight for the purpose of physical exercise.

Two general categories exist: "standard" plates, which have a center hole of approximately 25 mm (one inch), and "Olympic" plates, meant to fit on the 50 mm (two inches) sleeves of Olympic barbells.

Often, barbell collars can be problematic, for example, it is known that collars can axially slide along the sleeve of the barbell away from the weight plate. Allowing one or more plates to slide on a barbell during a lift can be difficult to balance and manage and may even cause injury.

It would be highly advantageous, therefore, to remedy the deficiencies inherent in the prior art. Accordingly, it is an object of the present invention to provide an improved barbell collar that does not slip and is easy to engage and disengage from the barbell.

SUMMARY

In accordance with the invention, a barbell collar is configured to have an incrementally variable internal diameter throughout a path of rotation, thereby allowing the barbell collar to be selectively attached or detached to a barbell sleeve during operation by imparting directional rotation in a ratcheting manner.

In one embodiment, a barbell collar for securing a weight plate onto a sleeve of a barbell comprises a housing assembly forming a disk providing a variable diameter cylindrical channel for receiving the sleeve of the barbell therethrough. Generally, the housing assembly includes: an interior annular wall; an exterior annular wall; an outer radial wall having an exterior surface extending between the exterior annular wall and the interior annular wall. However, the housing assembly does not have to be round so long as it contains a roughly cylindrical channel for receiving a barbell sleeve. A plurality of housing fasteners is provided for securing the interior annular wall, exterior annular wall, and the outer radial wall while providing a plurality of longitudinal axis aligned in parallel. A compression ring is positioned and rotational within the housing assembly defining a thickness and a variable diameter. The progressive interior ring may include: a discontinuous circumference terminating at a first end and a second end; an inner surface periphery; and an outer surface comprising a segment of a tongue and groove interface, wherein the thickness of the compression ring along the tongue and groove interface increases between a first point and a second point. Further, a plurality of rollers rotatable about the respective plurality of longitudinal axis are included. The plurality of rollers is positioned between the compression ring and the housing assembly outer radial wall, and at least one roller interacts with the tongue and groove interface throughout a path of rotation.

In a version, a compressible material liner is coupled with the inner surface periphery of the compression ring.

These and other features of the present invention will become readily apparent upon further review of the following specification and drawings.

BRIEF DESCRIPTION OF THE DRAWINGS

These and other features, aspects, and advantages of the present invention will become better understood with regard to the following description and accompanying figures where.

DETAILED DESCRIPTION

Figure 2:
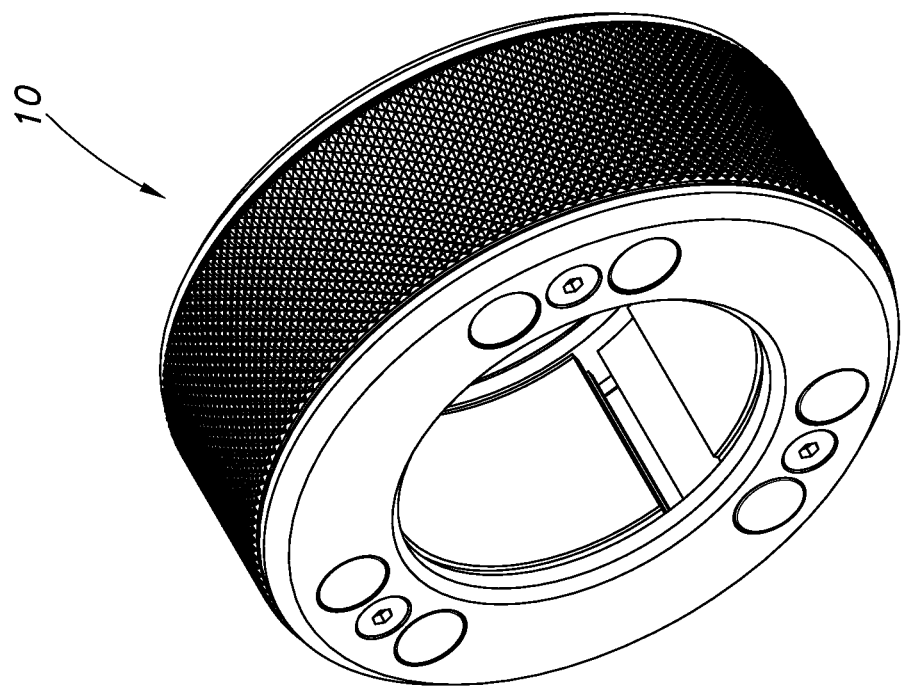
FIG. 2 is an interior side perspective view of the version shown in FIG. 1 shown with optional magnets.
Figure 1:
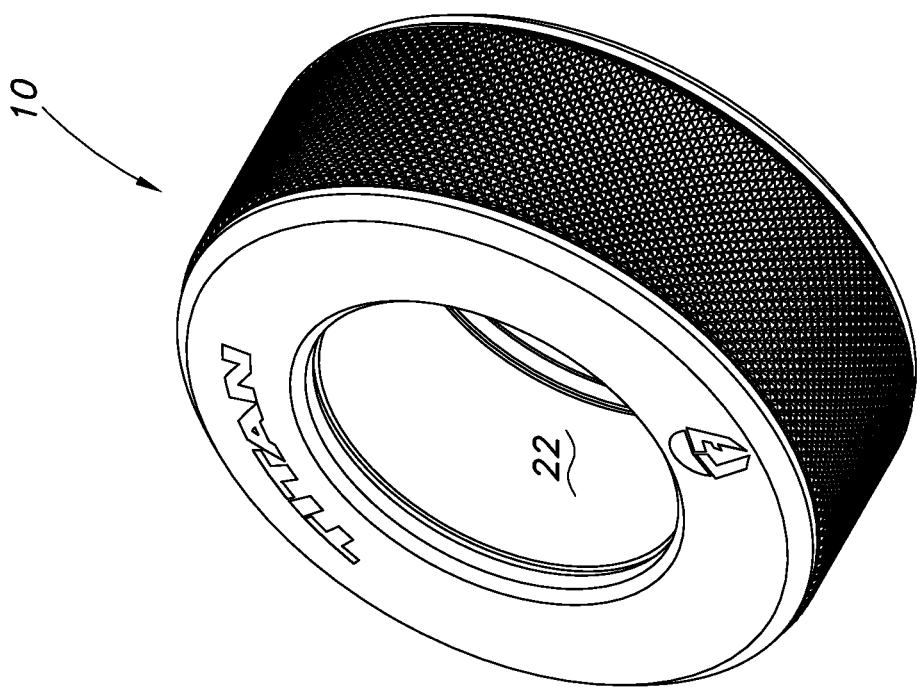
FIG. 1 is an exterior side perspective view of a version of the invention shown with optional manufacturer logos.

The following detailed description is presented to enable any person skilled in the art to make and use the invention.

For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

Referring now to the figures wherein the showings are for purposes of illustrating a preferred version of the invention only and not for purposes of limiting the same, the present invention is a barbell collar which provides the ability to easily attach and detach from a barbell sleeve without axially sliding while attached and while the barbell is in use.

The following detailed description is of the best currently contemplated modes of carrying out exemplary versions of the invention. The description is not to be taken in the limiting sense but is made merely for the purpose of illustrating the general principles of the invention, since the scope of the invention is best defined by the appended claims. Various inventive features are described below that can each be used independently of one another or in combination with other features.

With reference to the figures, a general description of a version of the invention will be provided. As shown in FIG. 1-FIG. 6, a barbell collar 10 is disclosed which is configured to secure one or more weight plates 90 to a barbell 92. As discussed above, a barbell 92 comprises a shaft 94, a barbell sleeve 96, and a fixed interior collar 98. Specifically, the barbell collar 10 is configured to receive, grip, and constrict around the barbell sleeve 96 of the barbell 92, securely biasing the weight plates 90 against the barbell 92 interior collar 98 (See FIG. 6).

Figure 3:
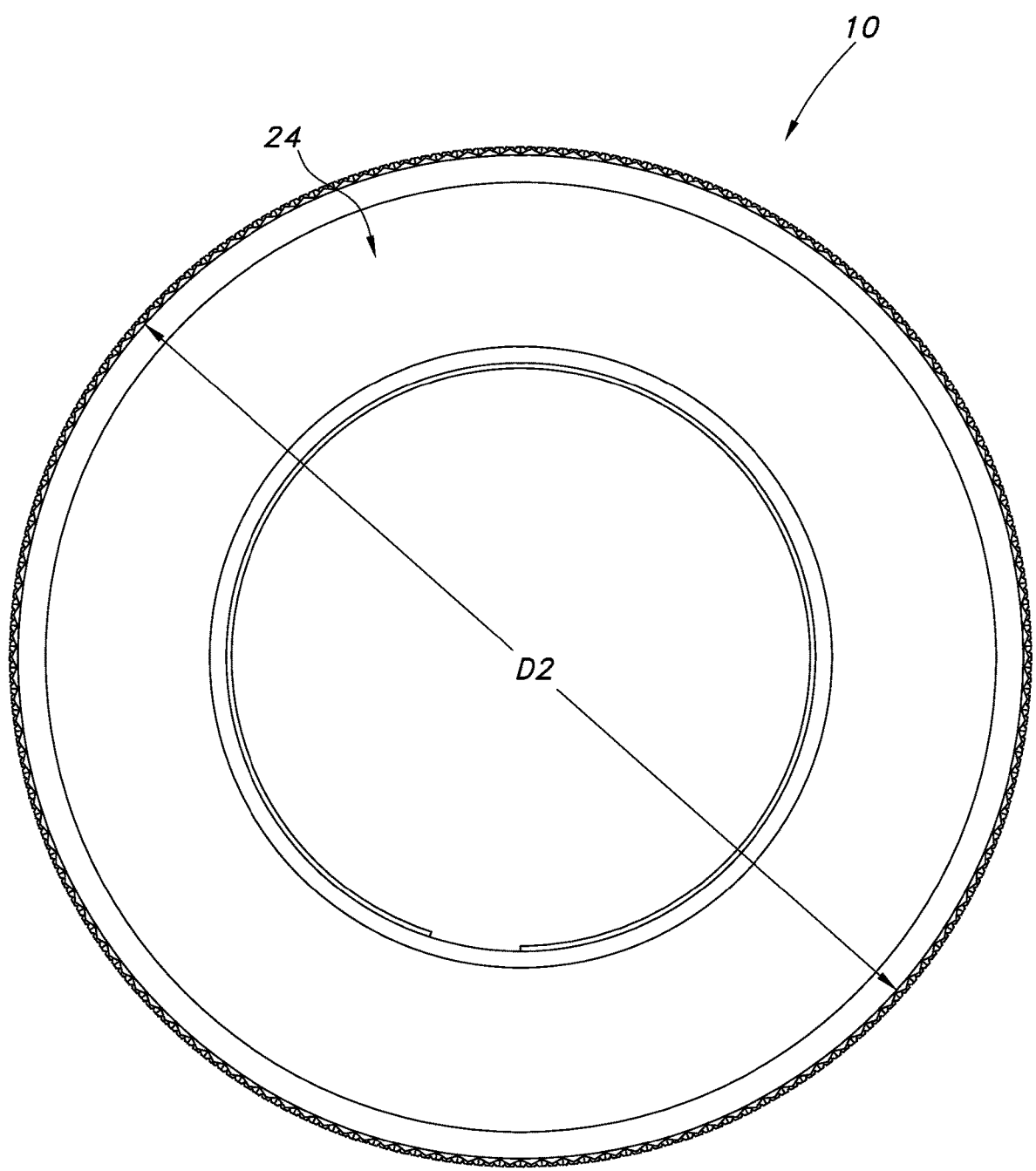
FIG. 3 is an exterior side elevation view of the barbell collar.

With reference to FIG. 1-FIG. 6, in one version of the invention, the barbell collar 10 is generally in the shape of a coaxial or annular cylinder having variable inner diameter D1, an outer diameter D2, and a width W. The inner diameter D1 of the annular cylinder defines a variable diameter cylindrical channel 22 which passes through the barbell collar 10 between an interior side 24 (FIG. 4) (which would face the weight plates) and an exterior side 26 (FIG. 3). Generally, the barbell collar 10 is configured to constrict about the barbell sleeve 96 by reducing the inner diameter D1 in response to a rotational force imparted upon the barbell collar 10 which will be described in more detail below.

Figure 7:
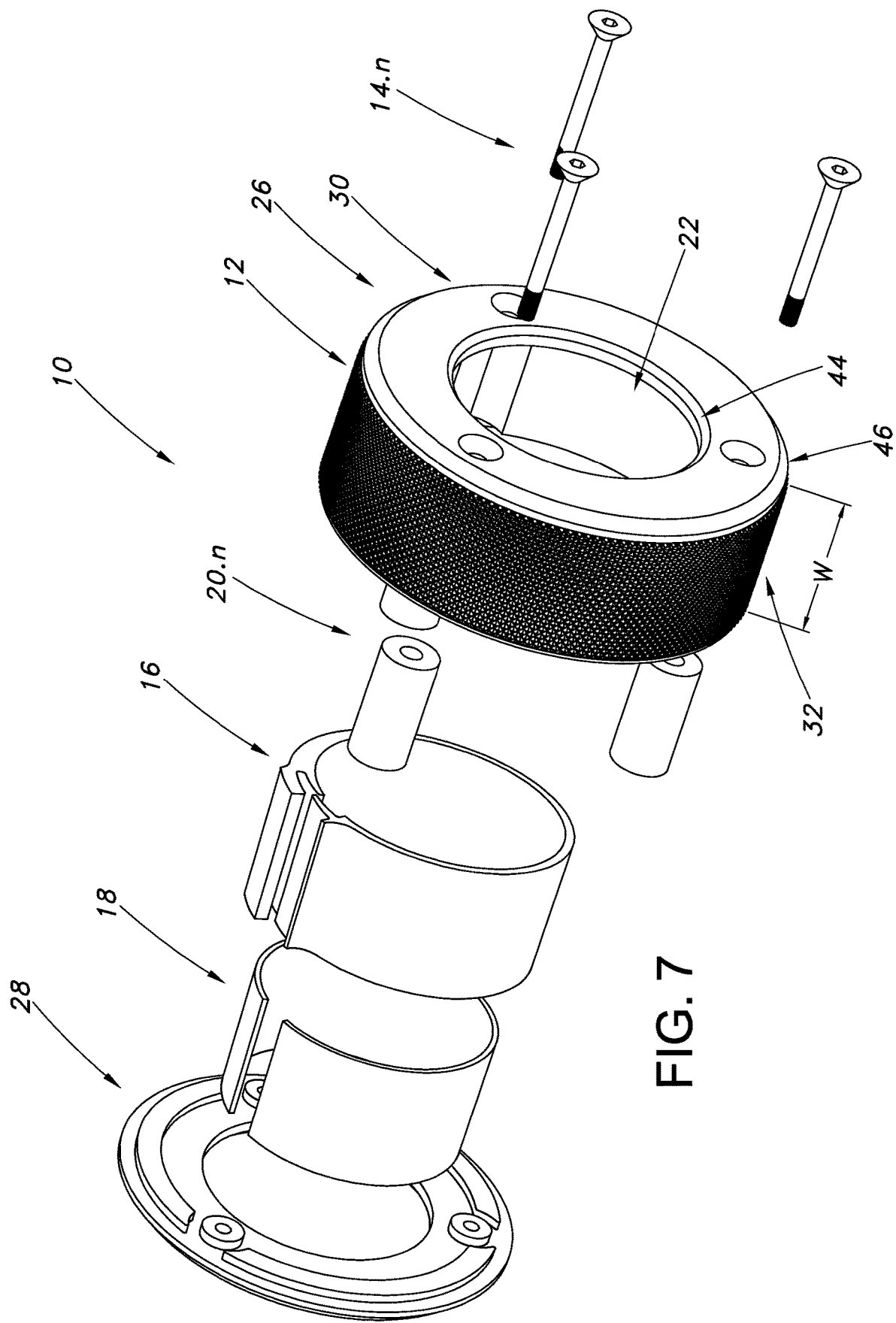
FIG. 7 is a first exploded perspective view of the version shown in FIG. 1 as viewed from the interior side.
Figure 8:
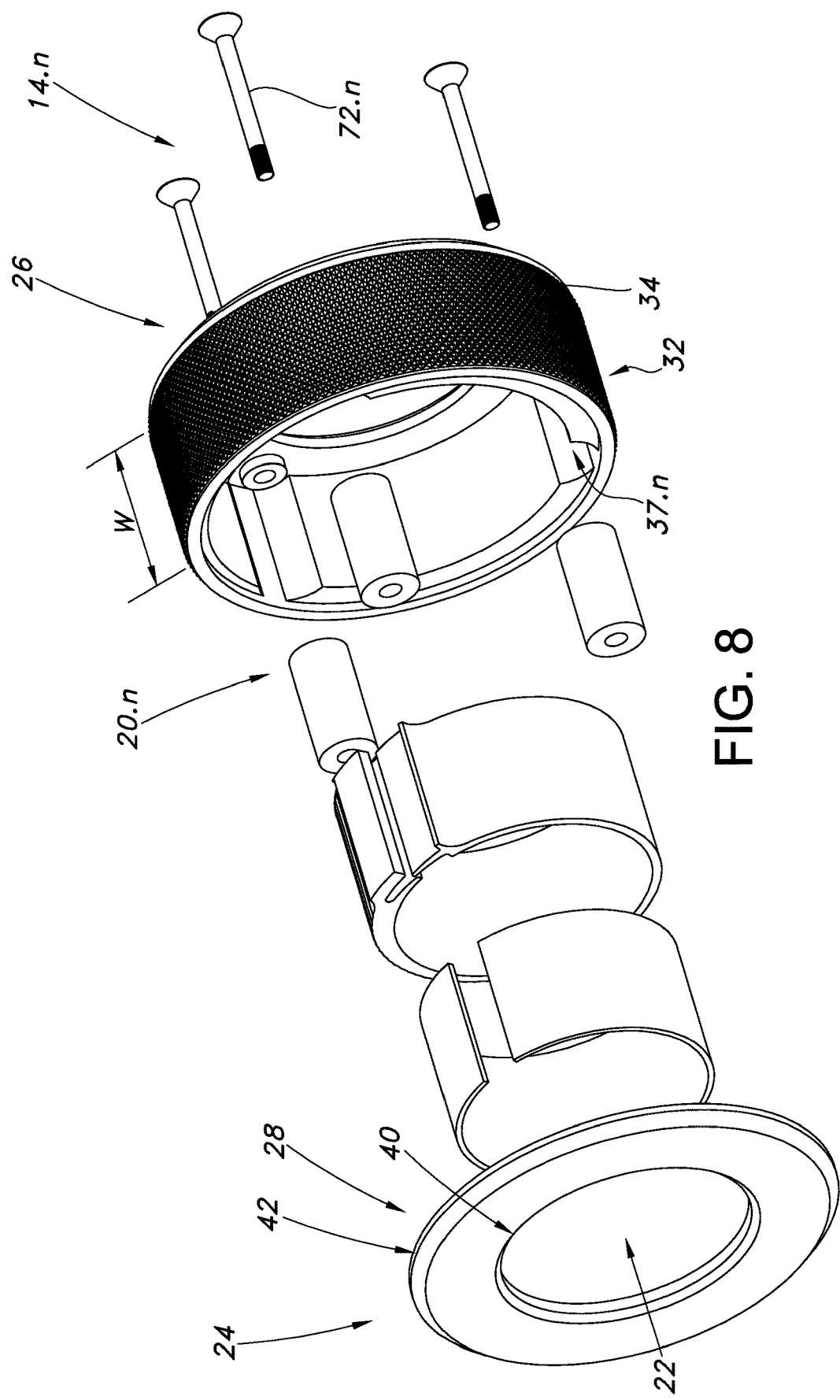
FIG. 8 is a second alternative exploded perspective view of the barbell collar as viewed from the exterior side.

Now with reference to the exploded views FIG. 7 and FIG. 8, in one embodiment, the barbell collar 10 generally comprises a housing assembly 12, a plurality of housing fasteners 14.$n$, a compression ring 16, a rubber liner 18, and a plurality of rollers 20.$n$ for rotating the housing assembly 12 relative to the compression ring 16.

As shown in this embodiment, the housing assembly 12 includes an interior annular wall 28, an exterior annular wall 30, and an outer radial wall 32, which may all be attachably removable. In the version, the interior annular wall 28 is attachably removable from the exterior annular wall 30 and outer radial wall 32 as shown which provides access to the inner workings of the barbell collar 10.

As will be appreciated from FIG. 7. the outer radial wall 32 forms the annular framework of the housing assembly 12. The outer radial wall 32 is approximately in the form of an annular structure having a width W and an exterior surface 34 formed between an interior side perimeter 36 and an exterior side perimeter 38. In certain embodiments, the exterior surface 34 may expose a textured surface for providing grip while rotation is imparted by hand to the barbell collar 10, for example, a knurled grip texture as shown. Other embodiments may include the exterior surface 34 being contoured surfaces or other shapes that facilitate easier grasping of the housing assembly 12. The interior side perimeter 38 includes roller indentations 37.$n$ each designed to house a roller 20.$n$ and facilitate movement of the housing assembly 12 around the compression ring 16. Note that although the housing assembly 12 as depicted is generally annular, it can be any shape so long as it contains a cylindrical channel 22 for receiving a barbell sleeve 22.

The interior annular wall 28 generally creates an annulus shaped end cap at the interior side 24 of the barbell collar 10 housing assembly 12. Specifically, the interior annular wall 28 is in the shape of an annulus or ring providing an inner perimeter 40 generally defined by the inner diameter D1 and an outer perimeter 42 defined by the outer diameter D2. The inner perimeter 40 defines the interior side 24 entrance to the cylindrical channel 22.

Figure 4:
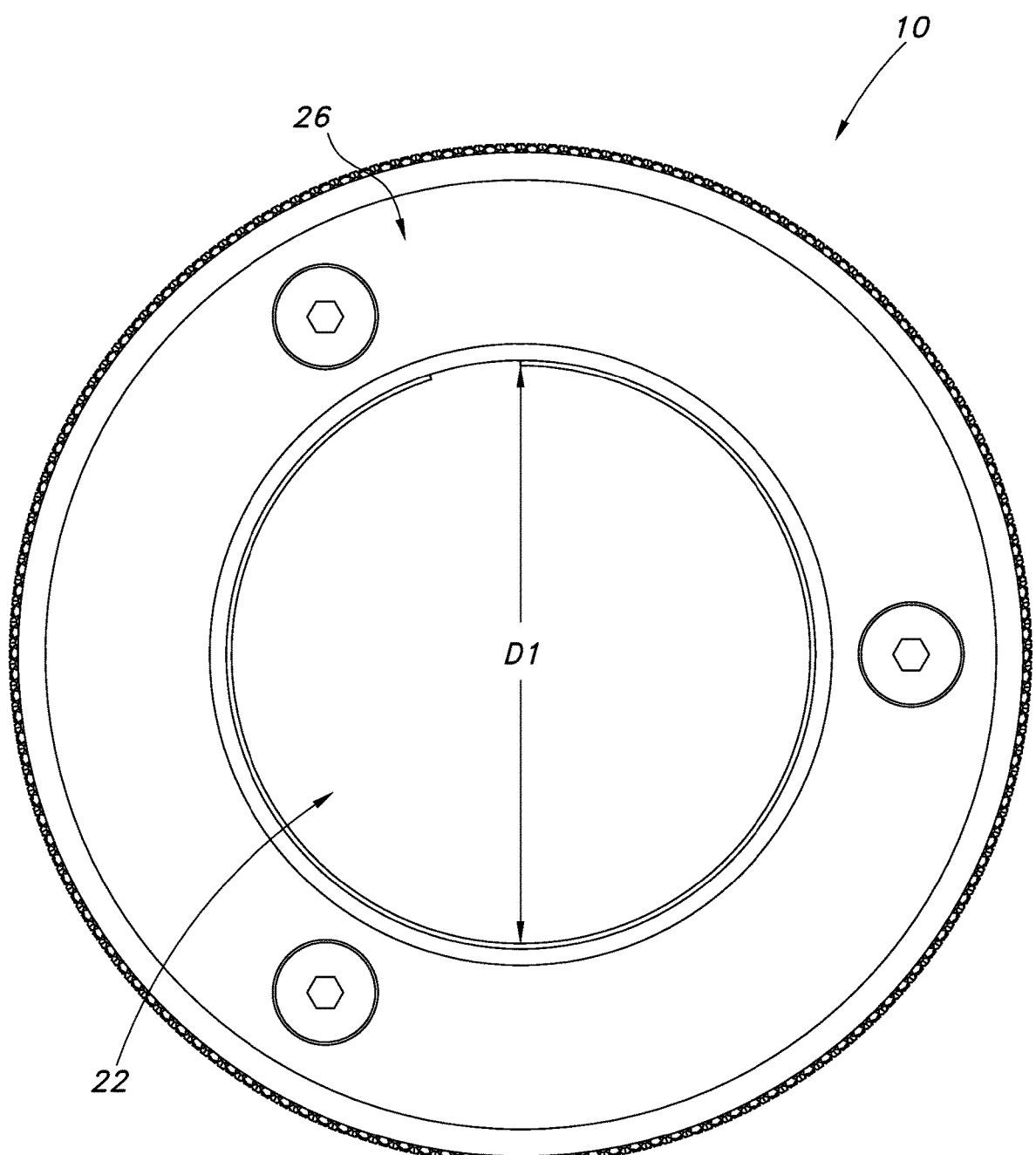
FIG. 4 is an interior side elevation view of the barbell collar (without optional magnets).
Figure 5:
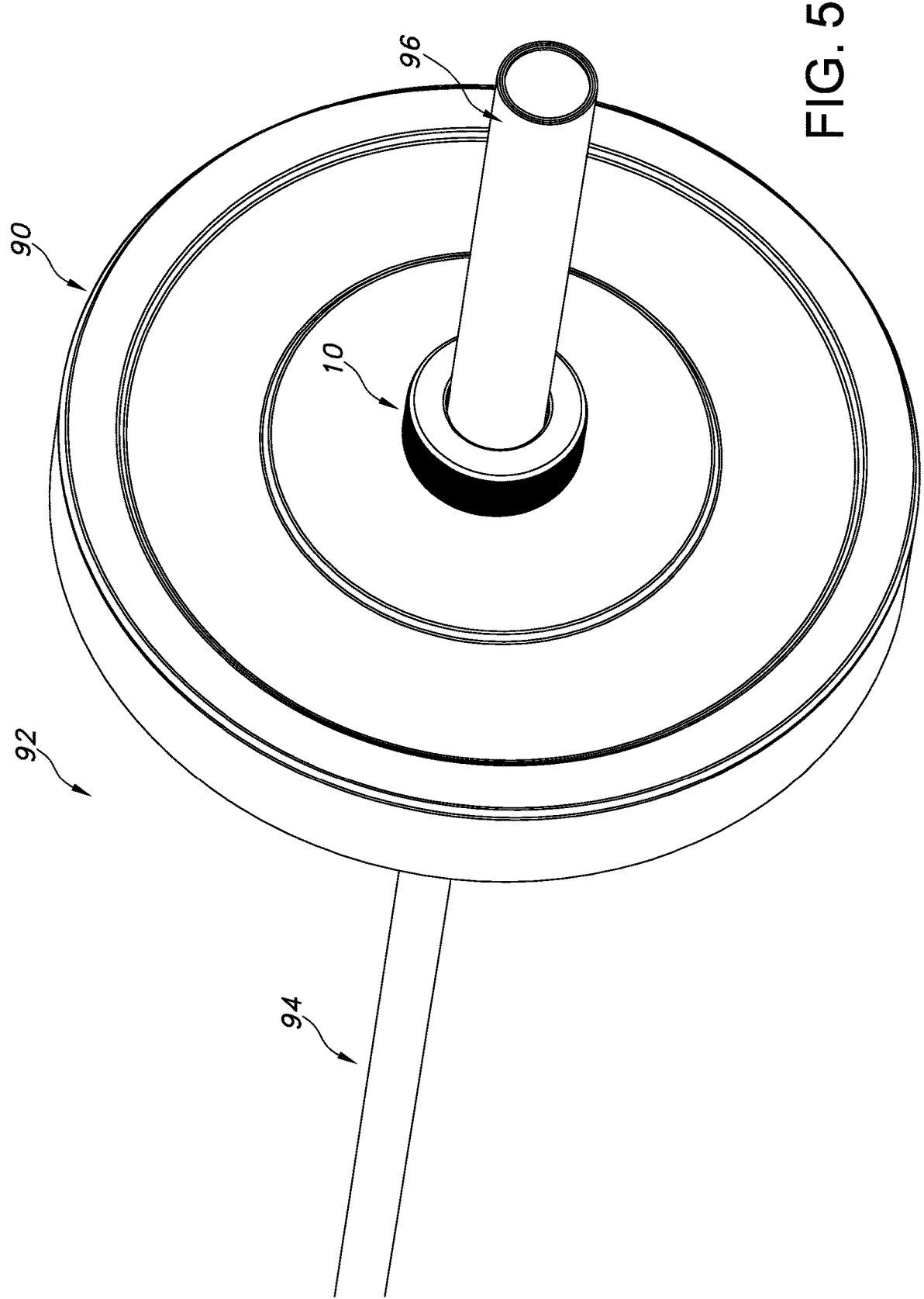
FIG. 5 is a perspective view of the barbell collar while attached to a barbell sleeve.
Figure 6:
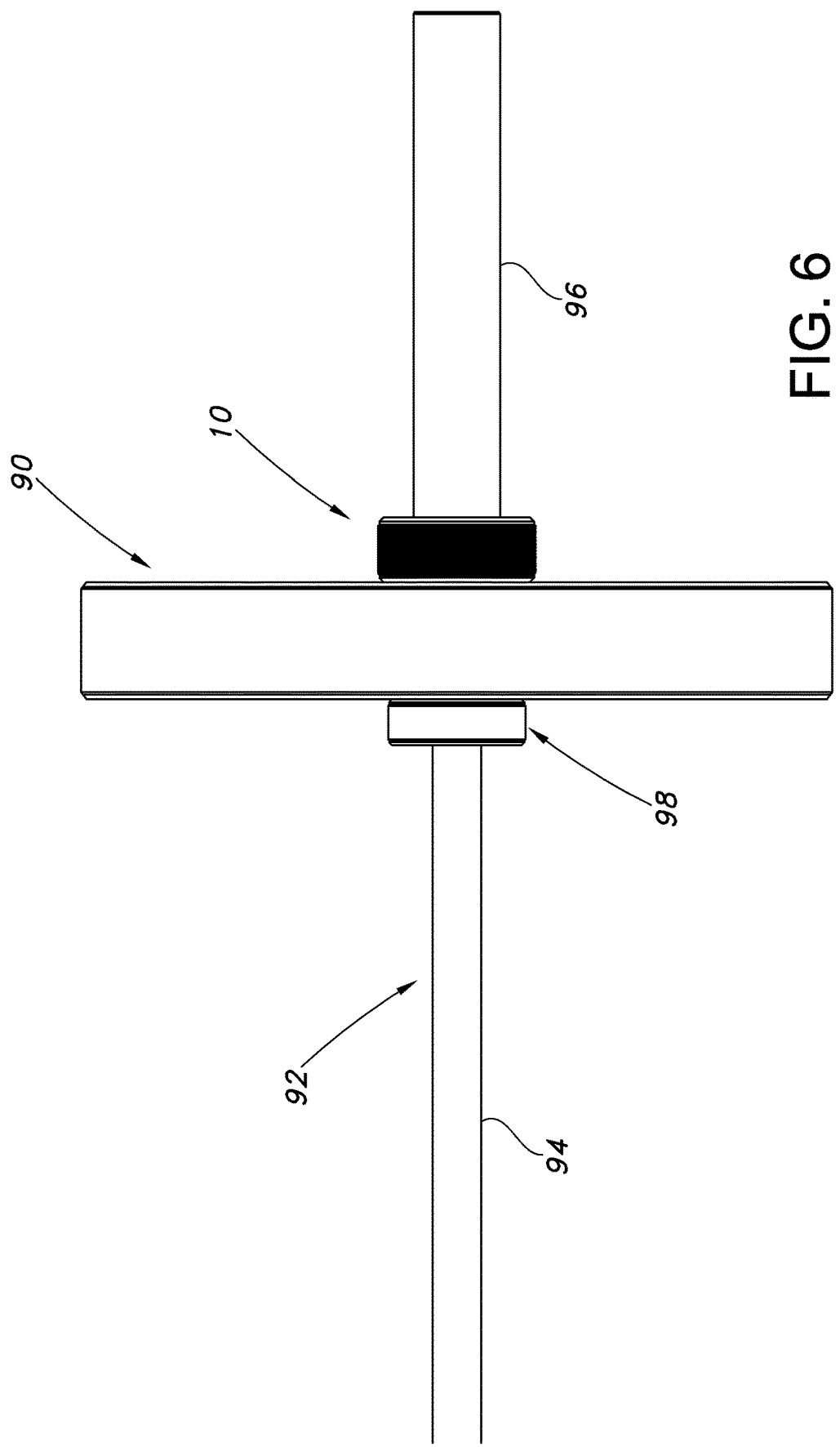
FIG. 6 is an elevation view of the version shown in FIG. 5 while attached to a barbell sleeve.

Similarly, the exterior annular wall 30 generally creates an annulus shaped end cap at the exterior side 26 of the barbell collar 10 housing assembly 12. As shown in FIG. 3 and FIG. 4, the exterior annular wall 30 is in the approximate shape of an annulus providing an inner perimeter 44 generally defined by the inner diameter D1 and an outer perimeter 46 defined by the outer diameter D2, but contoured shapes for that facilitate gripping may also be used. The inner perimeter 44 defines the exterior side 26 entrance to the cylindrical channel 22. It should be appreciated from the drawings that the exterior annular wall 30 may be any shape that accommodates the internal mechanisms of the barbell collar 10 and allows a barbell shaft to pass through its cylindrical channel 22.

As best shown in FIG. 9-FIG. 14 the compression ring 16 is positioned and operably movable within the housing assembly 12. In the version exemplified in FIG. 10, the compression ring 16 forms a discontinuous cylindrical-shaped cuff extending between a first end 48 and a second end 50, a discontinuity 89 existing therebetween. The compression ring 16 includes an inner periphery surface 52, an outer surface 54, a circumference or radial length, a width, a variable diameter $D_N$, and a variable thickness T along the length of the radial length (See specifically FIG. 10).

Figure 13:
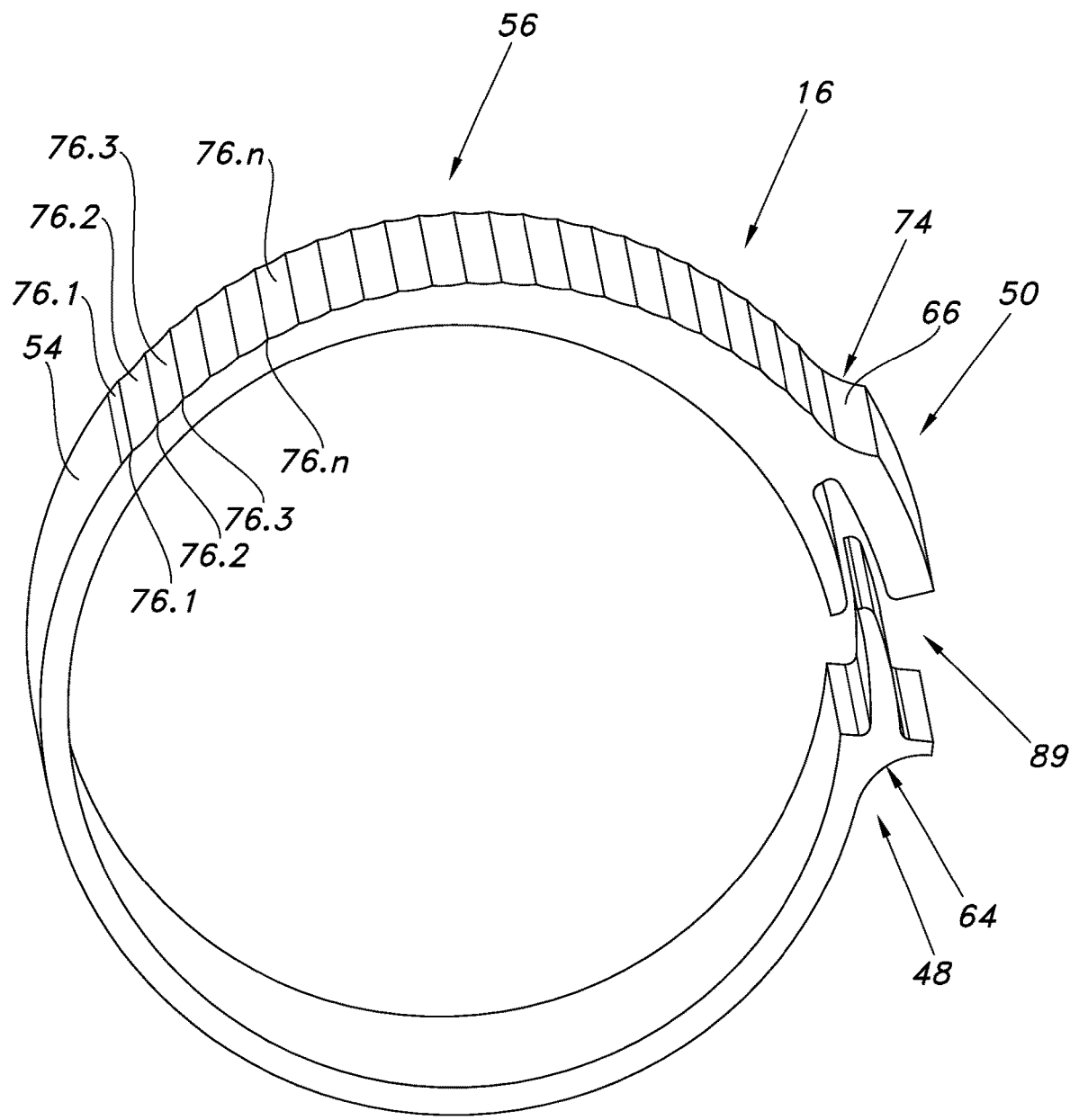
FIG. 13 is a perspective view of the compression ring of the barbell collar.

In a version, the outer surface 54 of the compression ring 16 includes a segment of the circumference length exposing a tongue and groove interface 56. The segment of tongue and groove interface 56 provides an increasing thickness T in the body of the compression ring 16 between a first point 68 and a second point 70 along the length of the circumference. In the version, the segment of the tongue and groove interface 56 extends approximately ⅓ of the length of circumference and is adjacent to the second end 50. As shown in FIG. 13, the tongue and groove interface 56 provides a plurality of sequential grooves 76.$n$ and ridges 78.$n$ providing incremental seating for receipt of the engagement roller 20.3 throughout the path of operation. In the version, there are twenty-four (24) grooves 76.$n$ and twenty-five (25) ridges 78.$n$.

Figure 11:
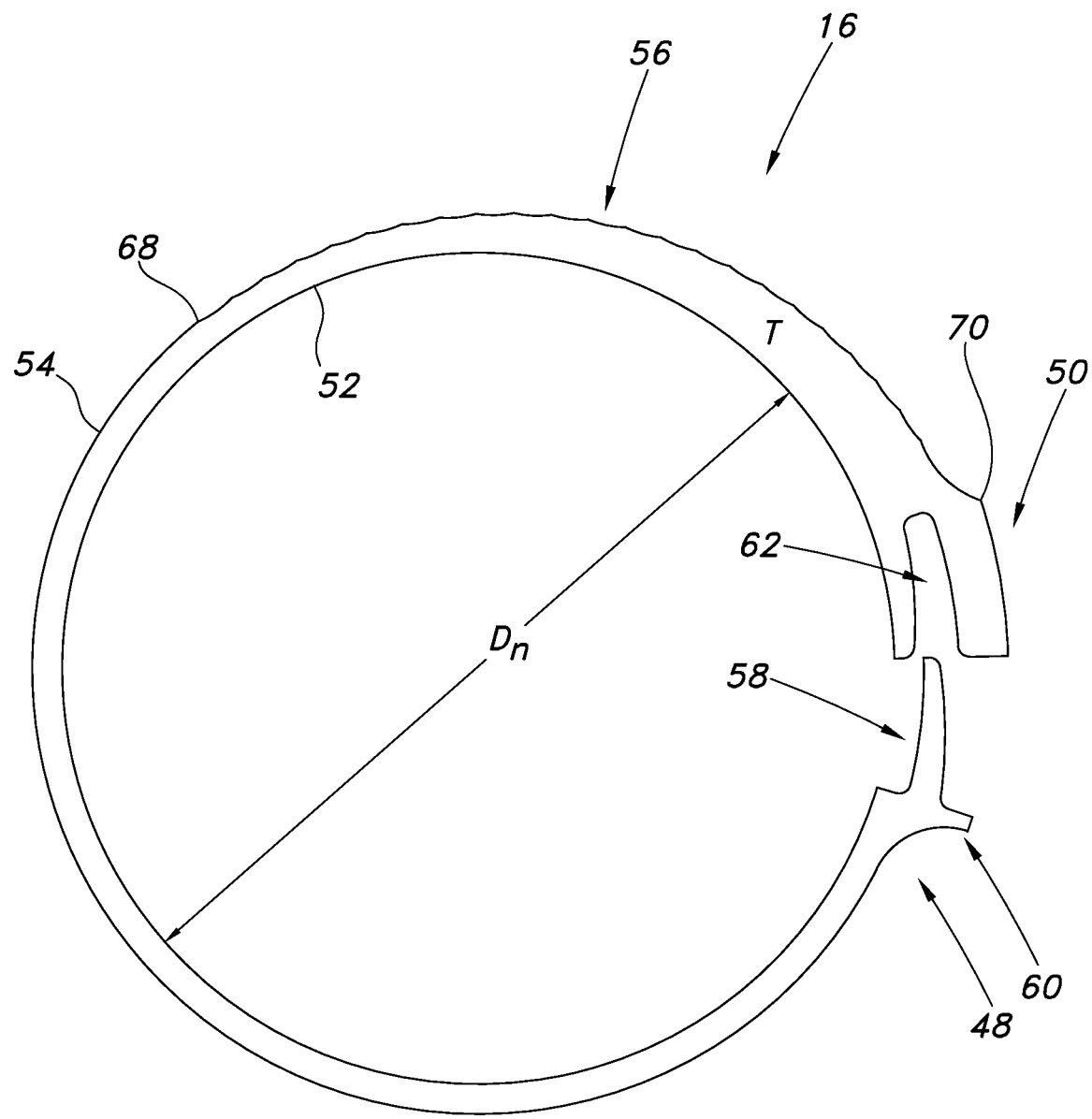
FIG. 11 is an elevation view of the compression ring of the barbell collar.

As shown in FIG. 11, the compression ring 16 radially extends between the first end 48 and the second end 50. The first end 48 includes a radially extending member 58 and an outward extending stop tab 60. The second end 50 includes a reciprocally shaped channel 62 for guiding and receiving the first end 48 radially extending member 58 throughout a path of operation.

Figure 10:
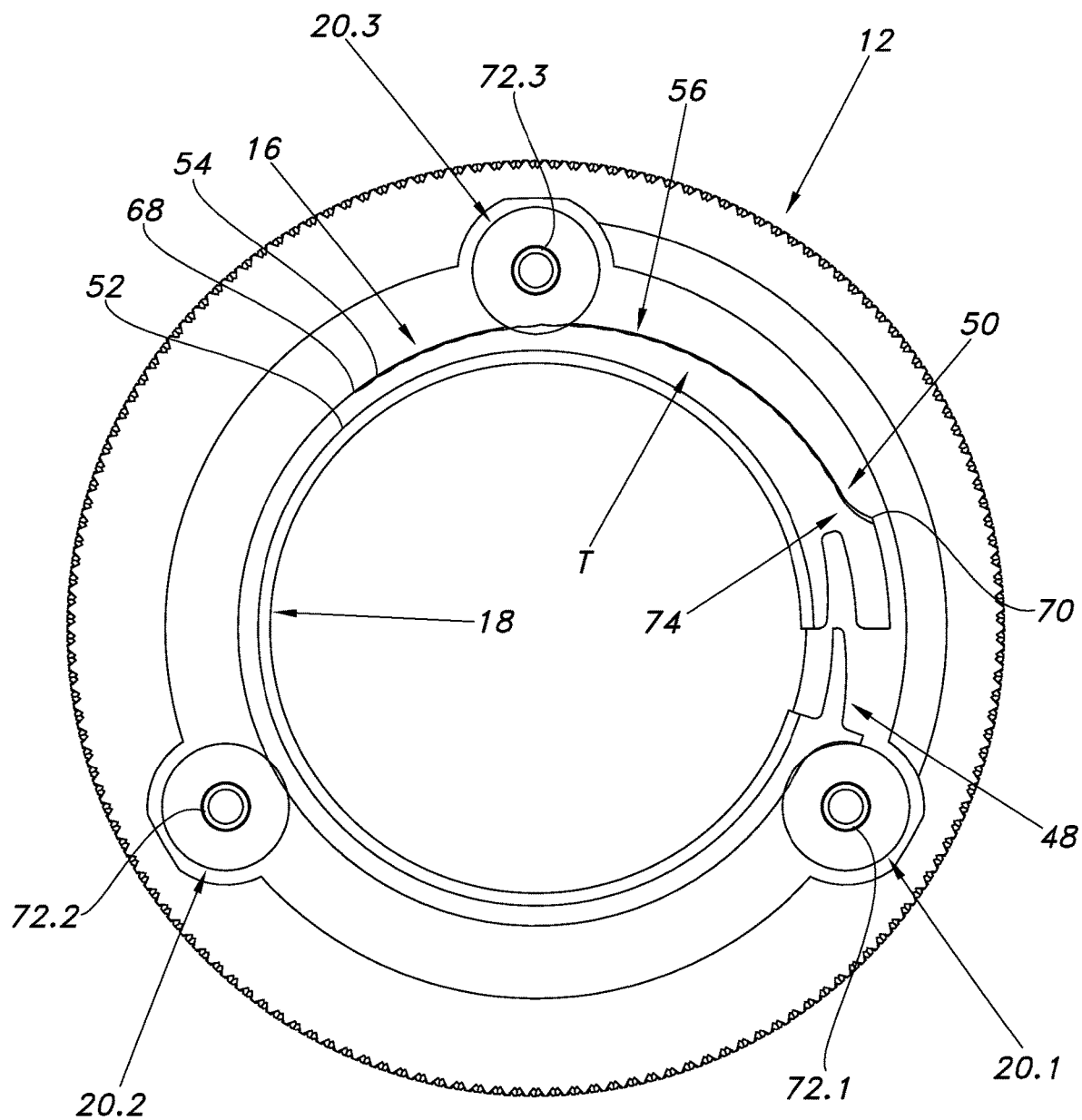
FIG. 10 is an elevation sectional interior view of the barbell collar.

With reference to FIG. 10, the inner periphery surface 52 of the compression ring 16 is lined with a compressible material such as the rubber liner 18, for example, a similar dimensioned rubber strip formed into the shape of a ring. The rubber liner 18 may be adhesively attached to the interior of the surface of the compression ring 16. Alternatively, the compression ring 16 may be made of a material with inherently grippy texture or surface such that no rubber liner 18 is needed. While attached to a barbell 92, the compressible material or rubber liner 18 provides a gripping action, preventing axial movement thereof. It should be appreciated that the rubber liner 18 may be made of any flexible, grippy material that will stop the barbell collar from sliding against the outer surface of the barbell shaft 94. In alternative embodiments, the compression ring 16 may itself be made of a material or texture that allows it to directly contact the barbell shaft, thus reducing the number of parts required.

Figure 9:
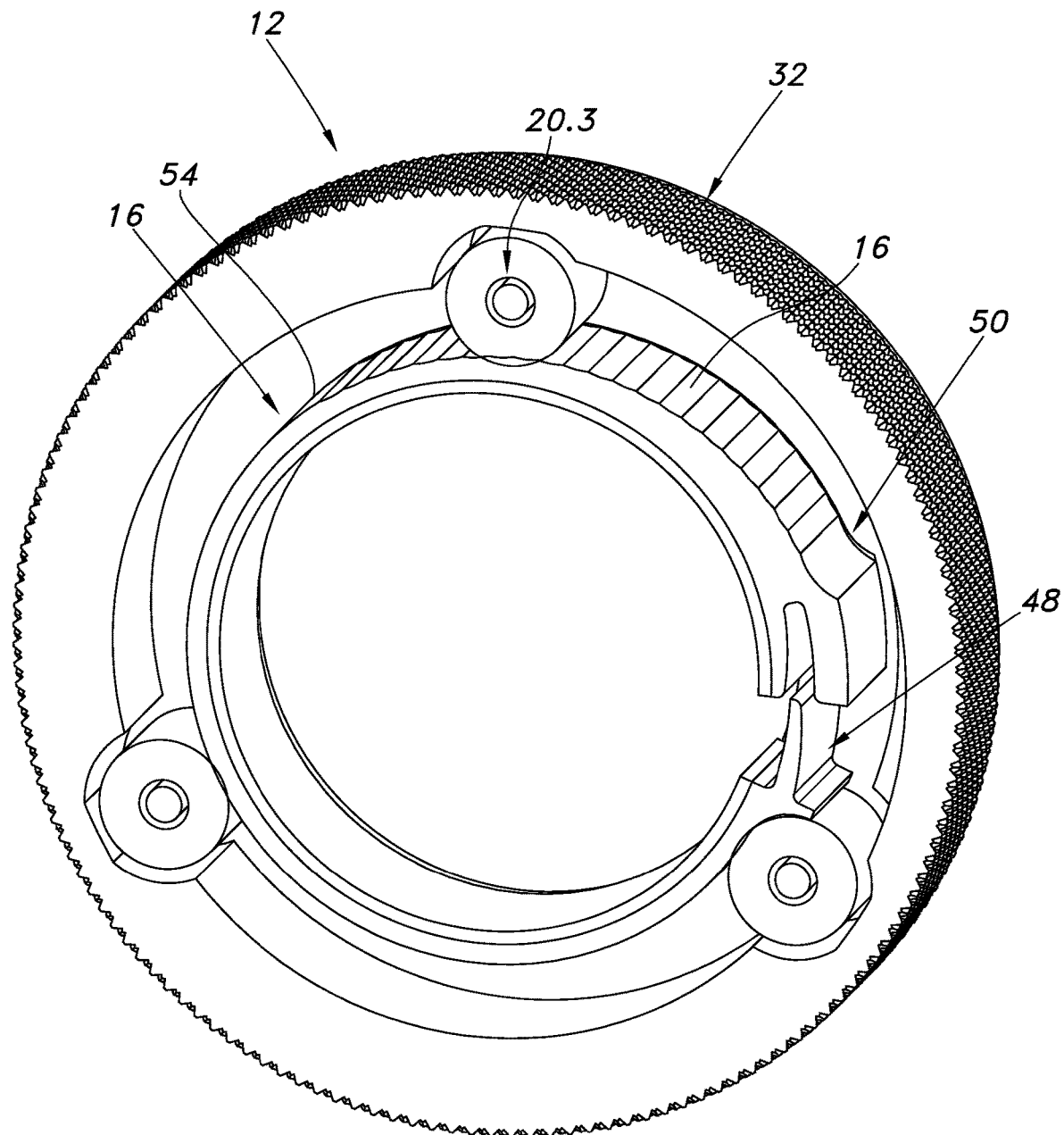
FIG. 9 is a perspective sectional interior view of the barbell collar.

In view of FIG. 8 and FIG. 9, the barbell collar 10 housing assembly 12 supports a plurality of radially disposed rollers 20.$n$, each having a longitudinal axis of rotation. Generally, the plurality of rollers 20.$n$ allow the housing assembly 12 to rotate relative to the compression ring 16. Preferably, the plurality of respective rollers 20.$n$ are radially positioned between the outer radial wall 32 and the compression ring 16, wherein each of the rollers 20.$n$ are in continuous contact with the outer surface 54 of the compression ring 16. As best shown in FIG. 9, at least one of the plurality of rollers 20.$n$ entitled the engagement roller 20.3 is configured to interact with the segment of the tongue and groove interface 56 during operation. Preferably, each of the respective rollers 20.$n$ are positioned radially equidistant from each other about the compression ring 16. Preferably, the rollers 20.$n$ are manufactured of nylon, although other durable materials may be used such as aluminum or steel.

In a preferred version, a plurality of housing fasteners or screws 14.$n$ are functionally utilized to provide respective longitudinal axis for each of the plurality of rollers 20.$n$ and collectively function to fasten the interior annular wall 28 to the outer radial wall 32. Thus, each respective roller 20.$n$ is rotatable about each respective screw body (axle) 72.$n$ within the housing assembly 12.

FIG. 10 is an example version of the barbell collar 10 which provides three (3) radially equidistant rollers 20.1, 20.2, and 20.3, each of which are interactively positioned about the compression ring 16 outer surface by approximately 120 degrees. As shown, the engagement roller 20.3 is configured to interact with the segment of tongue and groove interface 56 throughout the rotational movement of the housing assembly 12 of the barbell collar 10. As illustrated, each of the rollers 20.1, 20.2, and 20.3 are configured to rotate about a respective housing fastener or screw body axle 72.1, 72.2, and 72.3 provide parallel longitudinal axis of rotation for each roller 20.$n$.

With reference to FIG. 13, one or more roller stops 64, 74 may be provided along the length of the outer surface 54 of the compression ring 16. Generally, the roller stops 64, 74 have a curved, radial surface 66 which is reciprocal to that of the curvature of the rollers 20.$n$. For example, a first roller stop 64 may be positioned near the first end 48 outer surface 54. A second roller stop 74 may be positioned at the second end 50 aft of or integrated with the segment of the tongue and groove interface 56. Each of the roller stops 64, 74 provide rotational travel limits between the housing assembly 12 and the compression ring 16 between an expanded position (See FIG. 14A) and a max constricted position (See FIG. 14C).

Figures 14A, 14B, 14C:
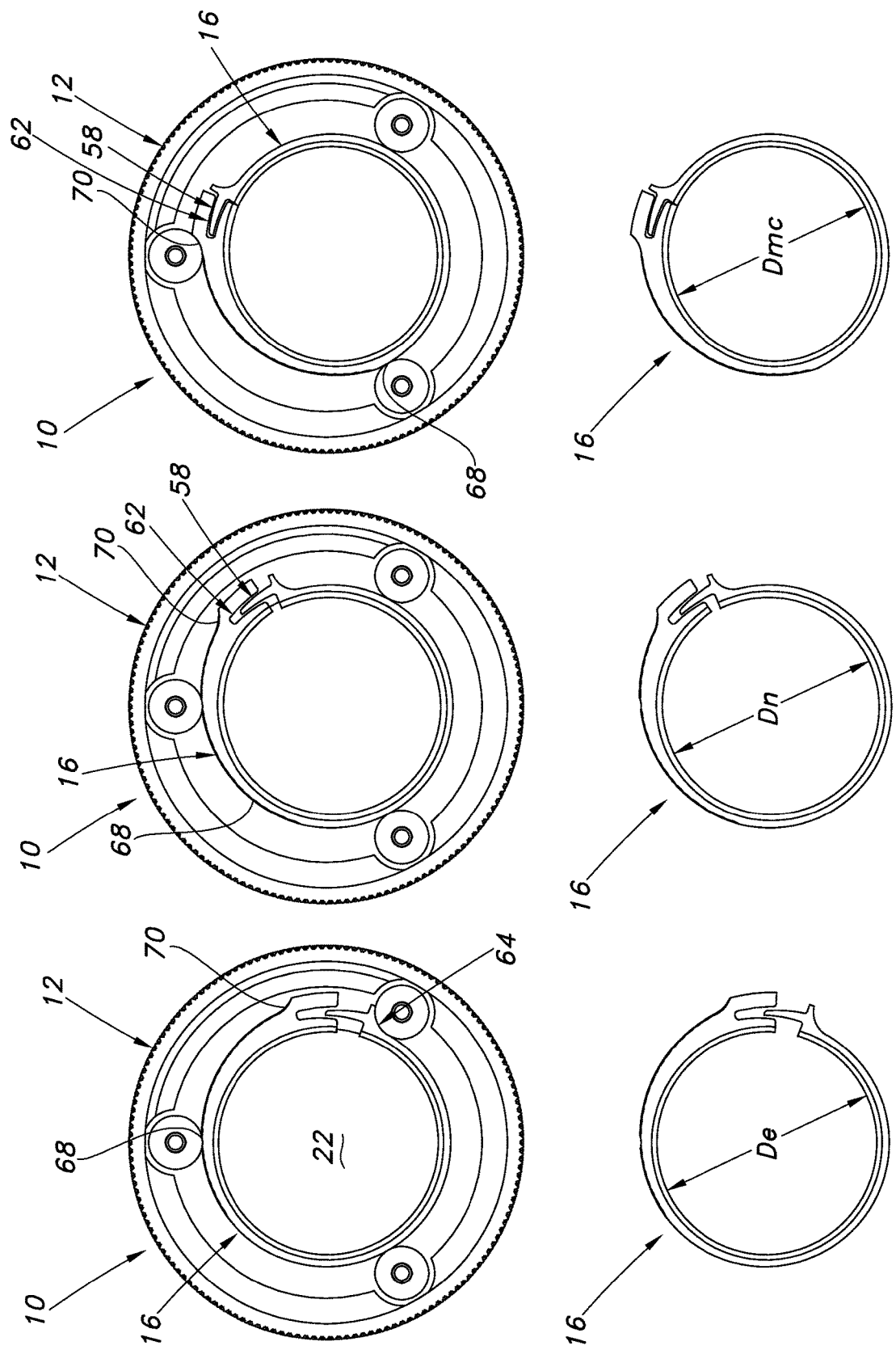
FIG. 14A is an elevation view of a sectional view of the barbell collar while in the default. expanded position with a detailed view of the compression ring shown below.
FIG. 14B is an elevation view of a sectional view of the barbell collar while in one of the intermediate positions with a detailed view of the compression ring shown below.
FIG. 14C is an elevation view of a sectional view of the barbell collar while in the max constricted position with a detailed view of the compression ring shown below.

With reference to FIG. 14A, FIG. 14B, and FIG. 14C, the functional aspects of the barbell collar 10 will now be described in detail. Generally, the barbell collar 10 securely grips the sleeve of a barbell 92 while attached to a barbell sleeve 96, thereby securing one or more weight plates 90 to the barbell 92 (See FIG. 6). The barbell collar 10 is configured to be easily attached and removed for changing weight plates 90 on the barbell 92. The barbell collar 10 operates between a default, expanded position having an expanded inner diameter $D_E$ and a max constricted position having a reduced inner diameter $D_{MC}$. Between the default, expanded position (FIG. 14A) and the max constricted position (FIG. 14C) are one or more intermediate progressively constricted positions providing incremental diameters $D_N$ (N=1 . . . x) which are determined by the location of the compression ring 16 relative to the housing assembly 12.

Figure 12:
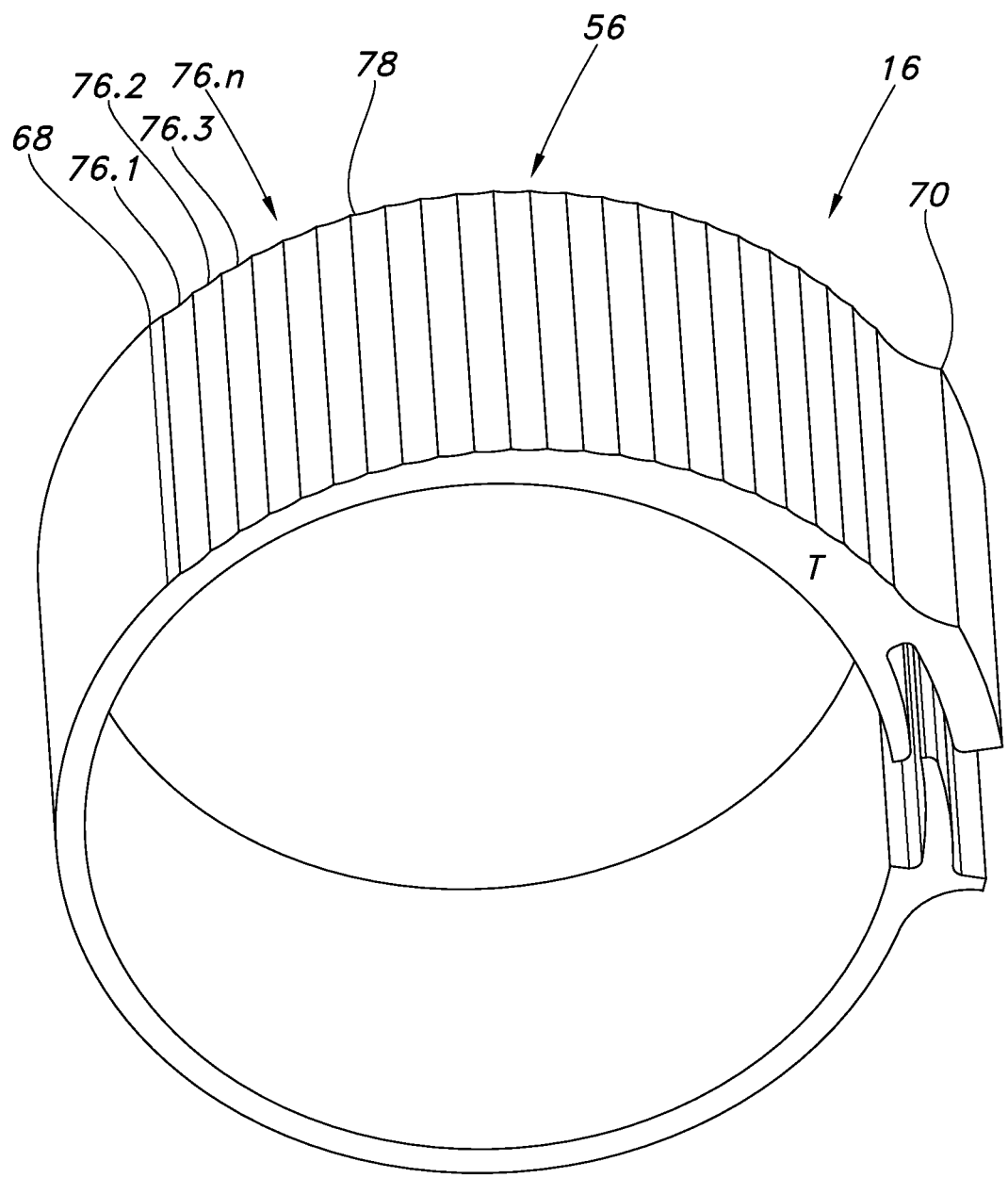
FIG. 12 is a perspective view of the compression ring of the barbell collar.

In more detail, referring to FIG. 14A-FIG. 14C, the barbell collar 10 is shown while in the default, expanded position. In this position, the barbell collar 10 compression ring 16 is in the expanded state, providing an expanded inner diameter $D_E$ that is adequate to accommodate the axial translation of the barbell collar 10 along the sleeve 96 of the barbell 92. Once the barbell collar 10 is positioned in the desired axial location along the barbell sleeve 96, the housing assembly 12 is caused to rotate relative to the compression ring 16 to reduce the inner diameter D in an incremental or ratcheting manner. Thus, as the housing assembly 12 is caused to rotate, the engagement roller 20.3 is caused to incrementally interact and move along the segment of tongue and groove interface 56 between the first point 68 in the default, expanded position (FIG. 14A) towards the second point 70 in the max constricted position (FIG. 14C). As shown in FIG. 12, throughout this path of motion, the engagement roller 20.3 incrementally interacts and seats with each consecutive groove 76.$n$. Each groove 76.$n$ provides sequential increments of rotation, thereby incrementally decreasing the compression ring 16 diameter $D_N$ (FIG. 14B). As best shown in FIG. 14A, because the thickness T of the body of the segment of tongue and groove interface 56 increases over its length, when the housing assembly 12 rotates the engagement roller 20.3 moves to the next groove 76.$n$+1, which incrementally constricts the compression ring 16, reducing the size of the inner diameter $D_N$. In turn, this action increases the grip strength of the compression ring 16 and rubber liner 18 upon the surface of the barbell sleeve 96.

Oppositely, in order to disengage the barbell collar 10 from the barbell 92 sleeve 96, the rotation of the housing assembly 12 is reversed, thereby moving the engagement roller 20.3 back towards the first point 68 default, expanded position (FIG. 14A). Thereafter, the barbell collar 10 is in the default, expanded position and can therefore be removed from the barbell 92.

The max constricted position is shown in FIG. 14C wherein the engagement roller 20.3 reaches a final groove 76.$n$ at the maximum thickness T of the segment of tongue and groove interface 56 or, in the version, at the second roller stop 74. While in the max constricted position, the radially extending member 58 fully engages the reciprocally shaped channel 62.

Multiple other embodiments of the invention are also contemplated as part of this invention.

The barbell collar 10 can be made in any manner and of any material chosen with sound engineering judgment.

Preferably, materials will be strong, lightweight, long lasting, economic, and ergonomic. The above described elements and mechanics can be inverted to operate in reciprocal or equivalent ways. In one embodiment, the housing assembly 12 is constructed of aluminum with knurling for ease of grip. However, it should be appreciated that any rigid material may be used for the housing assembly 12, including plastics and metals. Metals such as aluminum may be cast or machined. Use of plastics for housing assembly 12, such as ABS or polycarbonate, serve to reduce the weight of the barbell collar 10 where a lighter collar is preferred. Barbell collars 10 made of metal add weight and can additionally serve as fractional weights.

Figure 15:
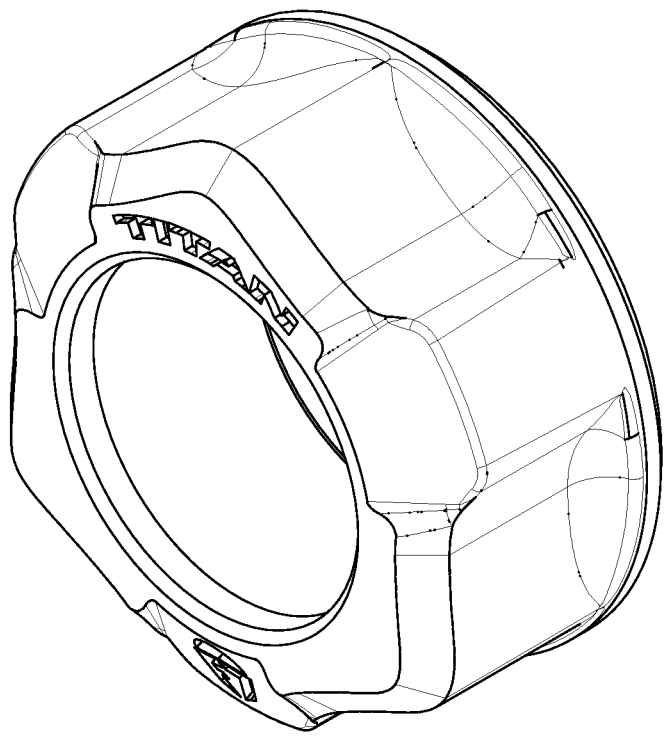
FIG. 15 is a perspective view of the plastic version of the barbell collar.
Figure 16:
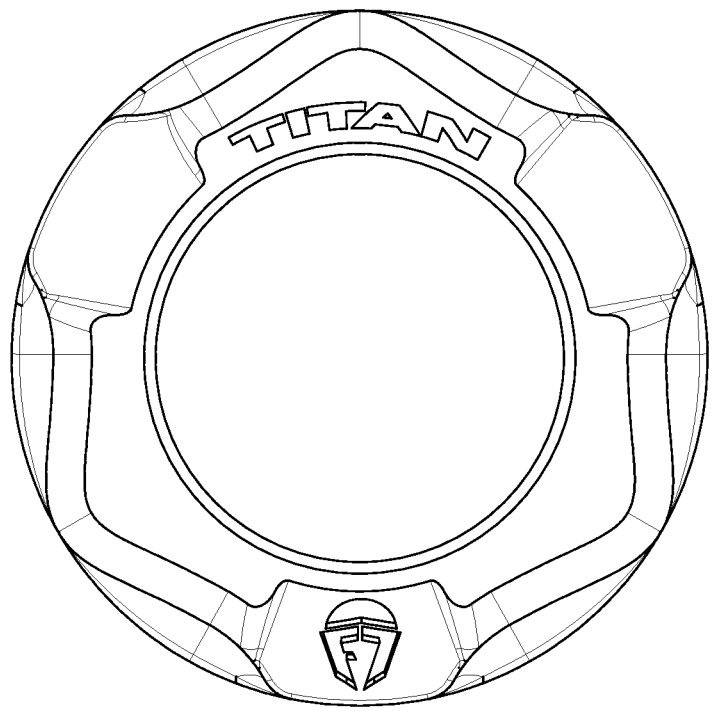
FIG. 16 is an elevation view of the exterior side of the plastic version of the barbell collar.

Although the preferred embodiment shows the barbell collar 10 as a cylindrical shape, it should be appreciated that the barbell collar 10 can be any shape that permits at least a portion of the housing assembly 12 to rotate relative to the compression ring 16. For example, in the embodiment shown in FIG. 15 and FIG. 16, the exterior annular wall 18 and outer radial wall 32 are approximately hexagonal in shape to allow easier gripping and tightening of the barbell collar 10. There are also contours to conform to the hand.

In another embodiment, the interior annular wall 28 has a slight convex curve such that the outer edges of the barbell collar 10 are not flush with the weight plate 90. The slight curvature permits some lateral movement of the weight plates as is typical when the barbell 90 is dropped while the barbell collar 10 remains securely in place.

In yet another embodiment, the surface of the interior annular wall 28 contains magnets. The magnets permit the barbell collar to be attracted to other metal objects including weigh plates 90 or fitness racks. The user will appreciate the benefit of being able to magnetically attach the barbell collar 10 to the weight bench or weightlifting rack so that it is easy to store close to where it is being used.

Although the preferred embodiment includes three rollers 20.n and a single compression ring 16, any number of rollers and compression rings may be used. For example, in one embodiment, there are two rollers and the compression ring is split into two separate arcs of approximately 180 degrees situated opposite of each other. When the housing assembly 12 is rotated into a locked state, even pressure is applied to two sides of the barbell sleeve. This splitting of the compression ring 16 into two halves may additionally result in a cost reduction.

It should be appreciated that the compression ring 16 can be replaced with any number of segments that independently apply pressure to the barbell sleeve 96. For example, instead of the single piece that mostly surrounds the barbell sleeve 96, three approximately 120-degree arcs can be used each with a roller ramp on its outer surface. The internal surface of the arc segments maintains the rubber grip layer. In this embodiment, each of the arc segments needs to be anchored or fixed at the low side of the ramp, likely by adding integral molded tabs that locks or fits into corresponding recesses in the housing assembly. When the barbell collar 10 is turned clockwise, this would apply pressure from three sides keeping the barbell collar 10 centered on the barbell sleeve 96.

Figure 17A:
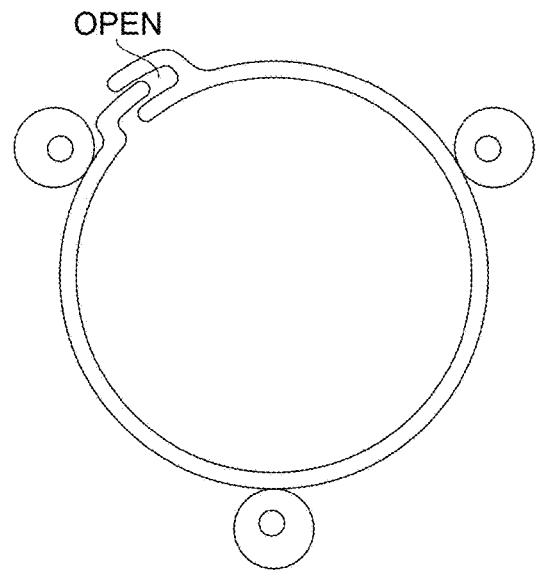
FIG. 17A is a depiction of an embodiment having off-center rollers in an open state.
Figure 17B:
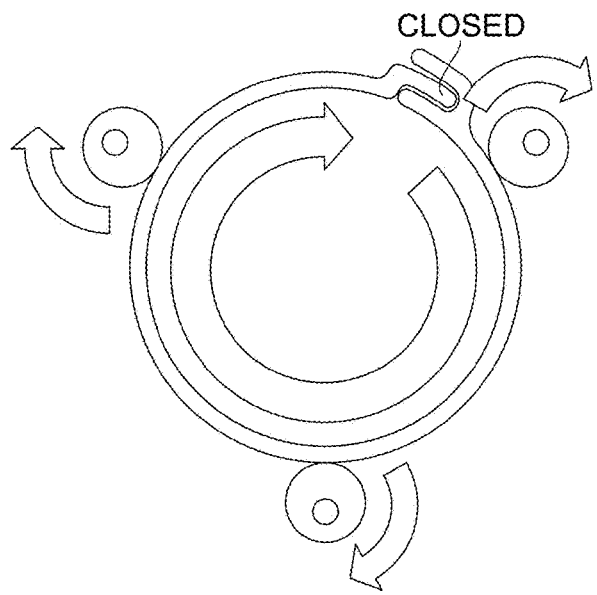
FIG. 17B is a depiction of an embodiment having off-center rollers in a closed state.

In an alternative embodiment shown in FIG. 17, the rollers 20 are designed such that their axis of rotation is offset from center, creating a cam action. The cam action closes the compression ring 16 around the barbell sleeve 96 reducing the need for the compression ring 16 to be thicker at one end. The cam-action of the offset rollers would close the compression ring 16 around the barbell sleeve 96 instead of a ramp. To make sure that the outward pressure on the compression ring 16 doesn't cause the cam to slip, both the compression ring 16 and the offset rollers could have interlocking gear teeth. Closing the compression ring 16 with a cam could theoretically be accomplished with a single offset roller with the rest being concentric rollers.

Figure 18:
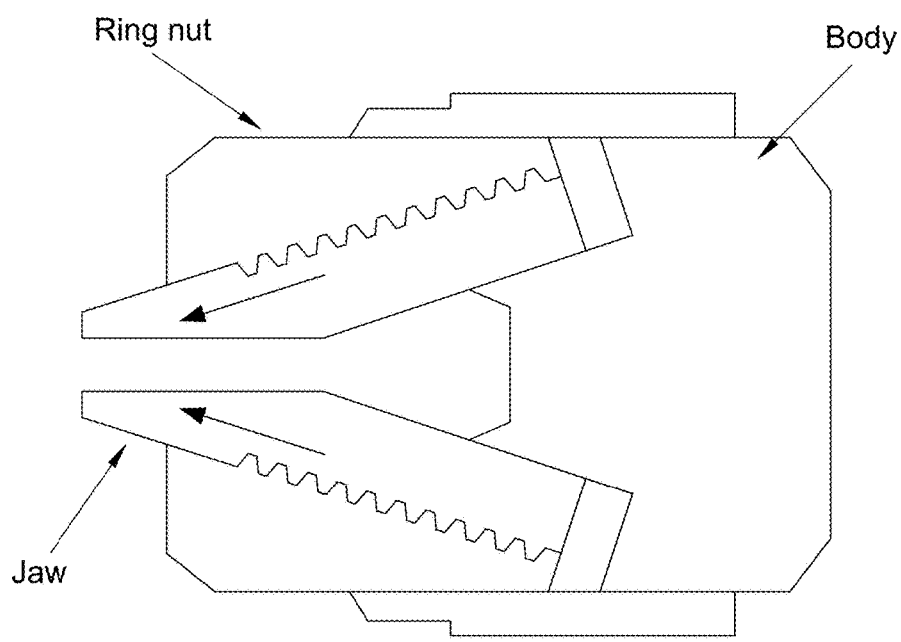
FIG. 18 is a depiction of an embodiments using a chuck-style method of operation.

In another variation of the barbell collar 10, the inner mechanism of the barbell collar 10 operates similar to a drill chuck as shown in FIG. 18, where rotating the outer ring nut causes the jaws to tighten around the barbell sleeve. This embodiment would require the compression ring 16 to be divided into (3) three 120-degree arcs. Each of the 120-degree arcs would have grooves on the outer surface that correspond with the angled threads on the outer ring/housing. As the housing is rotated, the segmented arcs would slide inward at an angle to tighten around the barbell sleeve 96.

The invention does not require that all the advantageous features and all the advantages need to be incorporated into every version of the invention.

Although preferred embodiments of the invention have been described in considerable detail, other versions and embodiments of the invention are certainly possible. Therefore, the present invention should not be limited to the described embodiments herein.

All features disclosed in this specification including any claims, abstract, and drawings may be replaced by alternative features serving the same, equivalent or similar purpose unless expressly stated otherwise.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

I claim:

1. A barbell collar for securing a weight plate onto a barbell sleeve comprising:
   a) a housing assembly providing a cylindrical channel for receiving the sleeve of the barbell therethrough; and
   b) a compression surface positioned and rotatable within the housing assembly, the compression surface defining a thickness and a variable diameter, the compression surface comprising:
      a discontinuous circumference terminating at a first end and a second end;
      an inner surface periphery; and
      an outer surface comprising a segment of a tongue and groove interface, wherein the thickness of the compression surface along the tongue and groove interface increases between a first point and a second point, wherein said diameter of said cylindrical channel decreases with the rotation of said housing assembly around said compression surface.

2. The barbell collar of claim 1 wherein said compression surface forms a discontinuous ring.

3. The barbell collar of claim 1 wherein a plurality of compression surfaces apply pressure to said barbell sleeve when said housing assembly is rotated relative to the compression surfaces.

4. The barbell collar of claim 3 wherein each of the plurality of compressions surfaces is arc-shaped.

5. The barbell collar of claim 1 wherein said housing assembly is made of plastic.

6. The barbell collar of claim 1 wherein said housing assembly is made of metal.

7. The barbell collar of claim 1 wherein said housing assembly further comprises a weight plate-facing side that is convex.

8. The barbell collar of claim 1 wherein said housing assembly further comprises a weight plate-facing side that contains magnets.

9. A barbell collar for securing a weight plate onto a sleeve of a barbell, the barbell collar comprising:
   a) a housing assembly forming an annular cylinder providing a variable diameter cylindrical channel for receiving the sleeve of the barbell therethrough, the housing assembly comprising:
      an interior annular wall;
      an exterior annular wall;
      an outer radial wall having an exterior surface extending between the exterior annular wall and the interior annular wall; and
      a plurality of housing fasteners for securing the interior annular wall, exterior annular wall, and the outer radial wall and providing a plurality of longitudinal axes aligned in parallel;
   b) a compression ring positioned and rotatable within the housing assembly, the compression ring defining a thickness and a variable diameter, the compression ring comprising:
      a discontinuous circumference terminating at a first end and a second end;
      an inner surface periphery; and
      an outer surface comprising a segment of a tongue and groove interface,
      wherein the thickness of the compression ring along the tongue and groove interface increases between a first point and a second point;
   c) a compressible material liner coupled with the inner surface periphery of the compression ring; and
   d) a plurality of rollers rotatable about the respective plurality of longitudinal axes, the plurality of rollers positioned between the compression ring and the housing assembly outer radial wall, at least one roller interacting with the tongue and groove interface throughout a path of rotation.

10. The barbell collar of claim 9, wherein the exterior surface of the outer radial wall is knurled.

11. The barbell collar of claim 9 further comprising magnets disposed on the interior annular wall.

12. The barbell collar of claim 9 wherein said housing assembly is made of metal.

13. The barbell collar of claim 9 wherein said housing assembly is made of plastic.

* * * * *